(12) United States Patent
Lin

(10) Patent No.: US 6,193,252 B1
(45) Date of Patent: Feb. 27, 2001

(54) TRAILING ROD ASSEMBLY FOR COUPLING A BABY CARRIER TO A BICYCLE

(76) Inventor: Wan-Hsin Lin, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/420,226

(22) Filed: Oct. 18, 1999

(51) Int. Cl.[7] .................................................... B62K 27/12
(52) U.S. Cl. ............................................ 280/204; 280/292
(58) Field of Search .................................. 280/204, 202, 280/486, 292, 288.4

(56) References Cited

U.S. PATENT DOCUMENTS

| | | | |
|---|---|---|---|
| 5,599,033 | * | 2/1997 | Kolbus et al. ....................... 280/204 |
| 5,695,208 | * | 12/1997 | Baechler et al. ..................... 280/204 |
| 5,829,771 | * | 11/1998 | Hsu .................................... 280/204 |
| 5,947,497 | * | 9/1999 | Hsu .................................... 280/204 |
| 6,056,306 | * | 5/2000 | Rust et al. .......................... 280/204 |

FOREIGN PATENT DOCUMENTS

3324971 * 1/1985 (DE) .................................... 280/204

* cited by examiner

*Primary Examiner*—Brain L. Johnson
*Assistant Examiner*—Avraham H. Lerner

(57) ABSTRACT

A trailing rod assembly is provided to couple front ends of two lower beams of a baby carrier to a bicycle chain stay. The trailing rod assembly includes a substantially S-shape rod, a front coupler mounted to a front end of the rod, a rear coupler mounted to a rear end of the rod, a wheel seat mounted to a mediate portion of the rod, and a beam-fixing seat mounted between the wheel seat and the rear coupler. The front coupler includes a main plate, a movable plate, a fixing knob, and a flexible tube, wherein the chain stay is securely held between the main plate and the movable plate. The wheel seat includes an L-shape slot for retaining an axle of a front wheel of the baby carrier. The rear coupler includes a lower plate, an upper plate, and two fixing knobs, wherein the rear end of the rod is soldered to a surface of a mediate groove of the lower plate.

1 Claim, 6 Drawing Sheets

TRAILING ROD ASSEMBLY FOR COUPLING A BABY CARRIER TO A BICYCLE

BACKGROUND OF THE INVENTION

1. Field of the Invention

The present invention relates to a trailing rod assembly for coupling a baby carrier, e.g., a stroller, to a bicycle.

2. Description of the Related Art

Bicycles are often used for both sporting and recreation. A baby carrier may be trailed to the bicycle by a trailing rod assembly such that the baby may have fun together with parents. Nevertheless, the existing trailing rod assembly merely provides a point connection between the baby carrier and the bicycle and thus provides poor safety. In addition, the front wheel of the baby carrier that is removed for trailing purpose cannot be carried along with the baby carrier trailed by the bicycle. As a result, it is impossible to push the baby carrier when the bicycle reaches the destination.

SUMMARY OF THE INVENTION

It is a primary object of the present invention to provide a trailing rod assembly for coupling front ends of two lower beams of a baby carrier to a bicycle chain stay, thereby providing a reliable connection. The trailing rod assembly includes a front coupler for securely connecting a front end of a rod of the trailing rod assembly to the bicycle chain stay. The trailing rod assembly further includes a rear coupler for securely connecting the front ends of the two lower beams of the baby carrier to a rear end of the rod. Thus, double positioning effect is obtained to ensure safety.

It is a secondary object of the present invention to provide a trailing rod assembly that includes a wheel seat for retaining the front wheel of the baby carrier in place. The front wheel of the baby carrier is thus carried along with the baby carrier trailed by the bicycle for convenient use.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
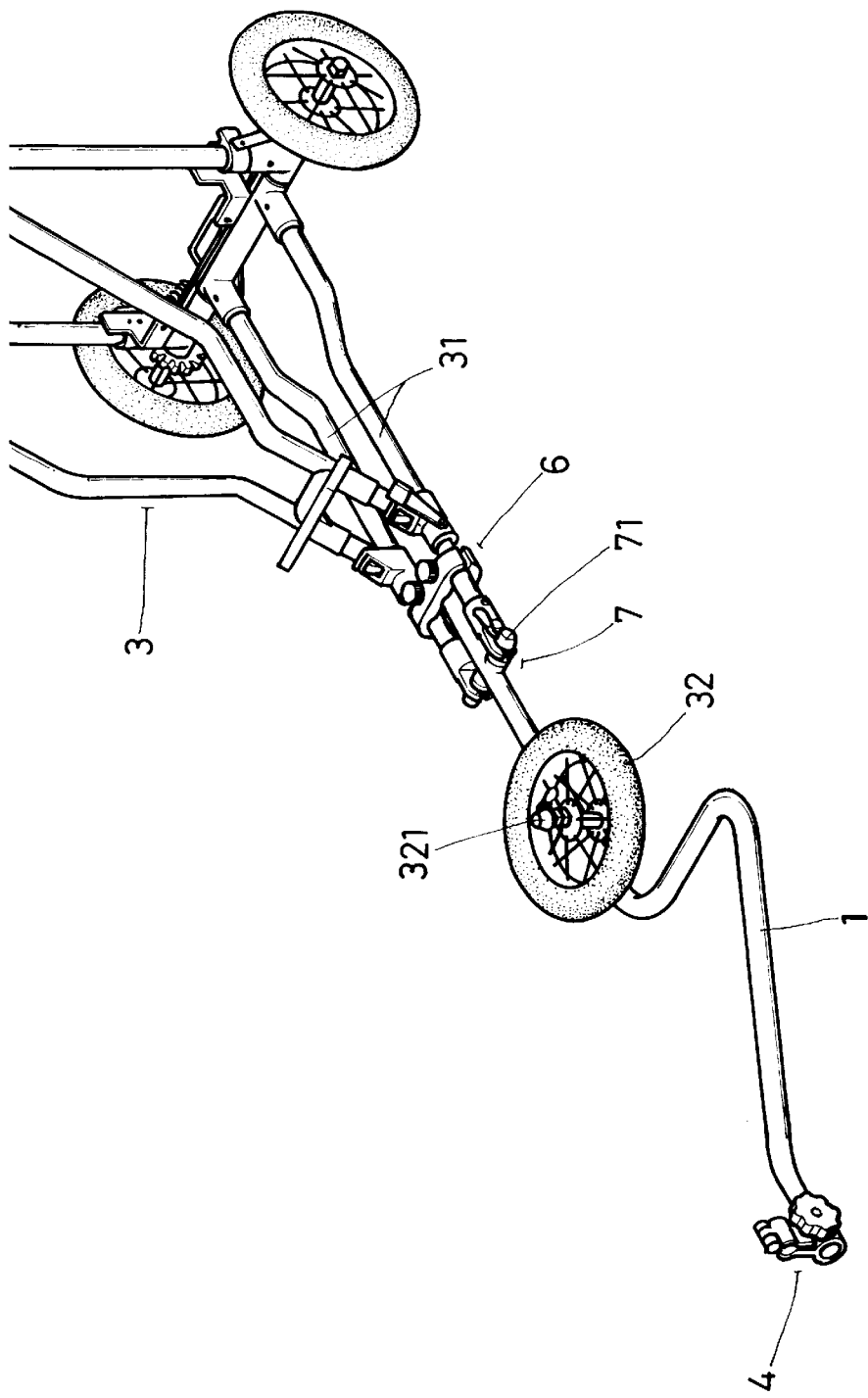
FIG. 1 is a perspective view of a trailing rod assembly in accordance with the present invention.
Figure 2:
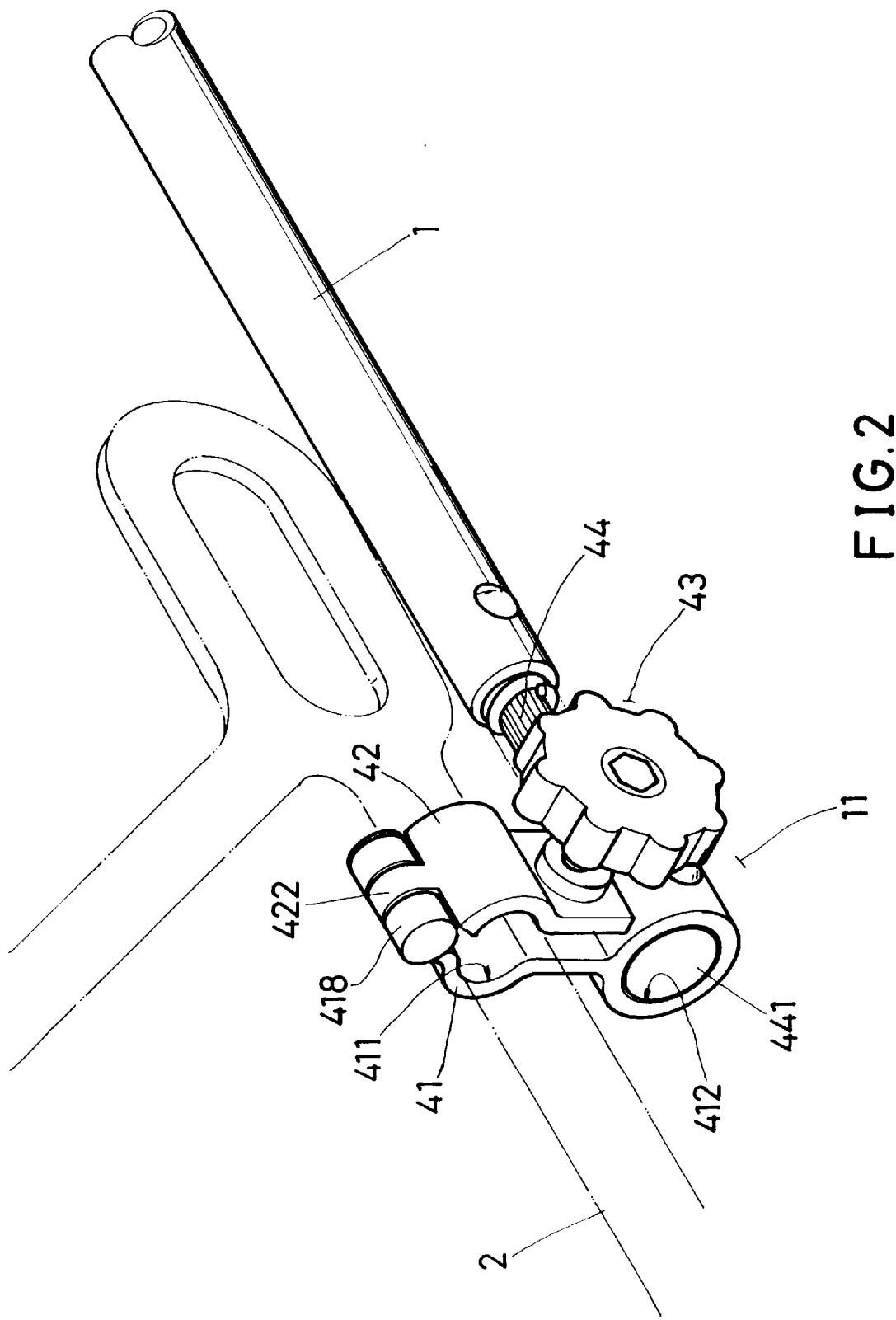
FIG. 2 is a perspective view illustrating engagement between a bicycle chain stay and a front coupler of the trailing rod assembly in accordance with the present invention.

Referring to FIGS. 1 and 2, a trailing rod assembly in accordance with the present invention is used to couple front ends of two lower beams 31 of a baby carrier 3, e.g., a stroller, to a bicycle chain stay 2. The trailing rod assembly includes a substantially S-shape rod 1, a front coupler 4 mounted to a front end of the rod 1, a rear coupler 6 mounted to a rear end of the rod 1, a wheel seat 5 mounted to a mediate portion of the rod 1, and a beam-fixing seat 7 mounted between the wheel seat 5 and the rear coupler 6.

Figure 3:
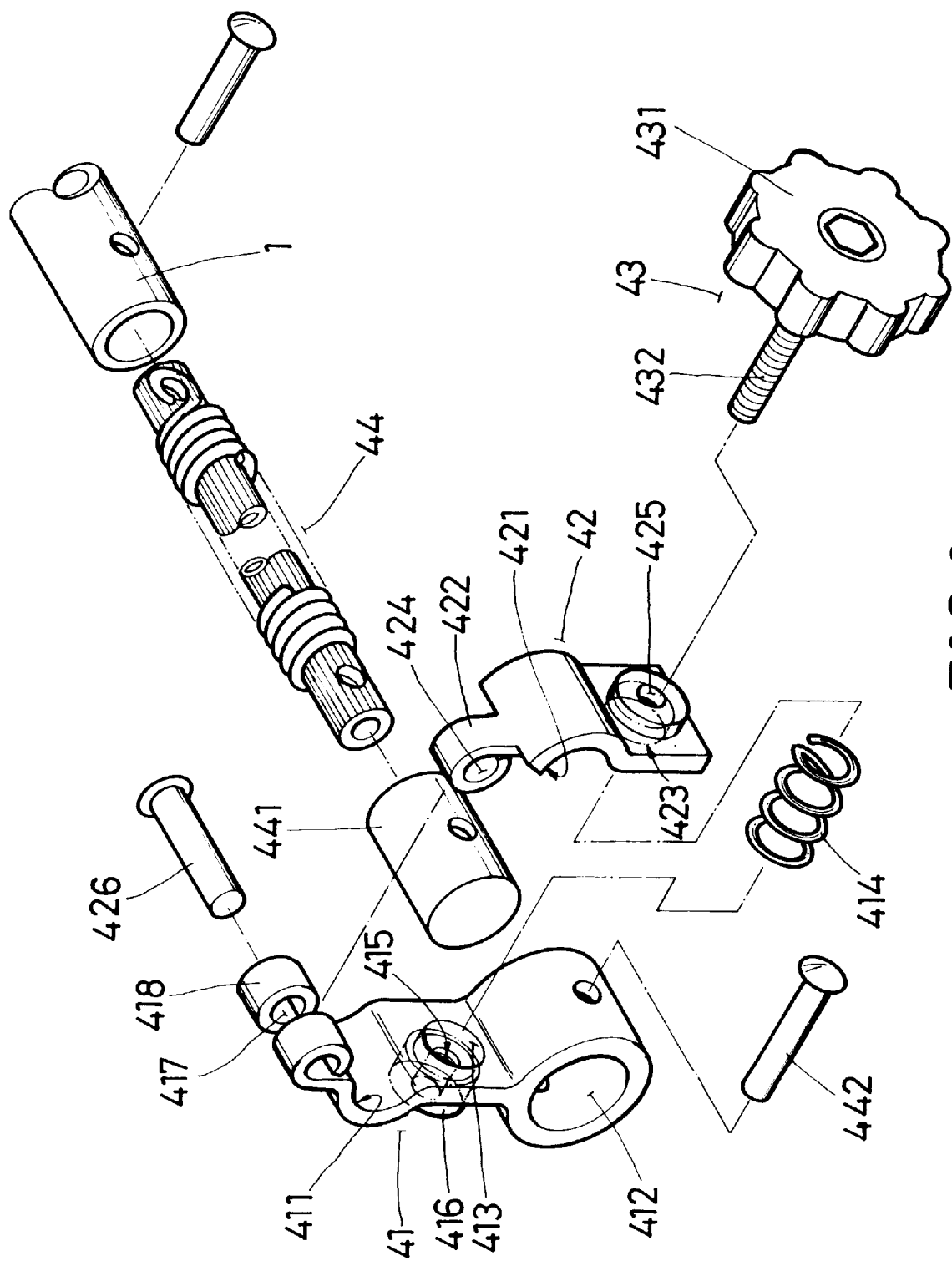
FIG. 3 is an exploded perspective view of the front coupler.
Figure 4:
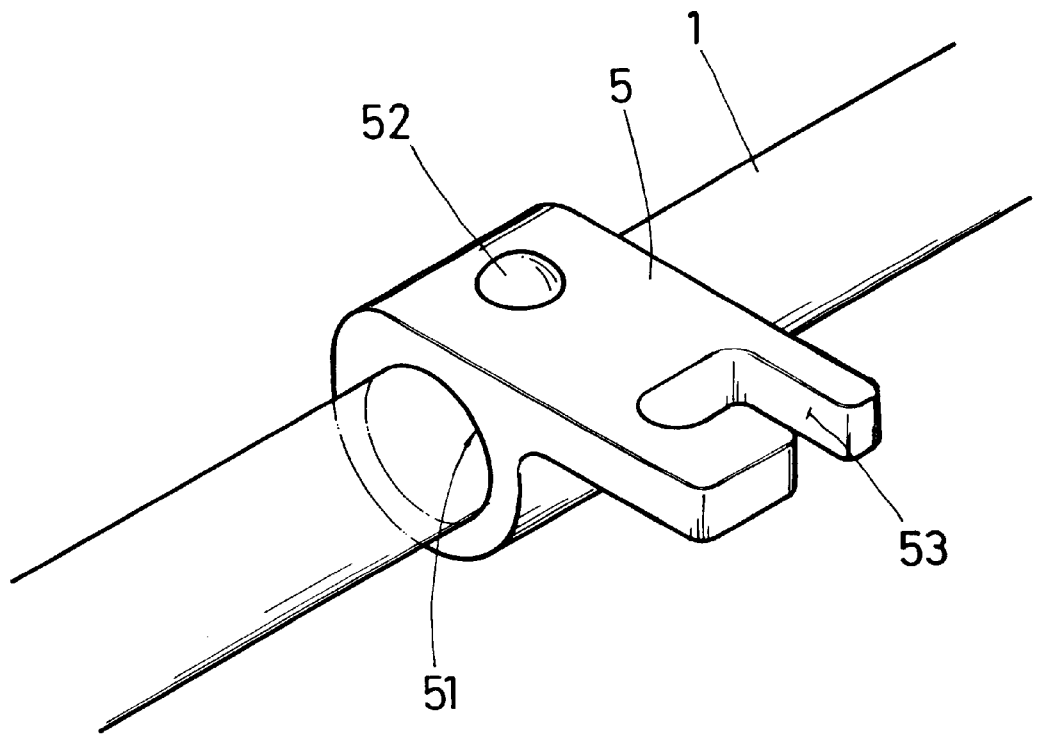
FIG. 4 is a perspective view of a wheel seat of the trailing rod assembly.

Referring to FIGS. 2 and 3, the front coupler 4 includes a main plate 41, a movable plate 42, a fixing knob 43, and a flexible tube 44. The main plate 41 includes an arcuate groove 411 defined in a first end thereof and a hollow cylinder 412 formed on a second end thereof. A receptacle 413 is defined in a mediate portion of the main plate 41 and includes a nut 416 embedded in an end thereof. The nut 416 has a screw hole 415. Two spaced lugs 418 are formed on the first end of the main plate 41 and include aligned holes 417. A transverse pinhole (not labeled) is defined in the hollow cylinder 412.

The movable plate 42 includes a first end with a lug 422 that is received between the spaced lugs 418, the lug 422 having a hole 424 aligned with the holes 417 of the lugs 418. A pivotal pin 426 is extended through the holes 417 and 422, thereby pivotally connecting the first end of the main plate 41 with the first end of the movable plate 42. The movable plate 42 further includes a second end with a receptacle 423 defined therein. A through-hole 425 is defined in the second end of the movable plate 42 and aligns with the receptacle 423. An arcuate groove 421 is defined in a mediate portion of the movable plate 42 and aligns with the arcuate groove 411 of the main plate 41. The two arcuate grooves 411 and 421 together define a space for fittingly, securely holding the chain stay 2.

An elastic member 414 includes a first end received in the receptacle 415 of the main plate 41 and a second end received in the receptacle 423 of the movable plate 42. The fixing knob 43 includes a main body 431 and a screw 432 projected from the main body 431. The screw 432 of the fixing knob 43 is extended through the through-hole 425 of the movable plate 42 and engaged in the screw hole 415 of the nut 416 embedded in the receptacle 413 of the main plate 41.

The flexible tube 44 includes a first end with a sleeve 441 mounted thereon, the first end being securely mounted in the hollow cylinder 412 by a pin 442 extended through the transverse through-hole of the hollow cylinder, a pinhole (not labeled) in the sleeve 441, and a pinhole (not labeled) in the first end of the flexible tube 44. The flexible tube 44 further includes a second end that is secured to a front end of the rod 1 by extending a pin (not labeled) through a pinhole (not labeled) in the front end of the rod 1 and a pinhole (not labeled) in the second end of the flexible tube 44.

Figure 5:
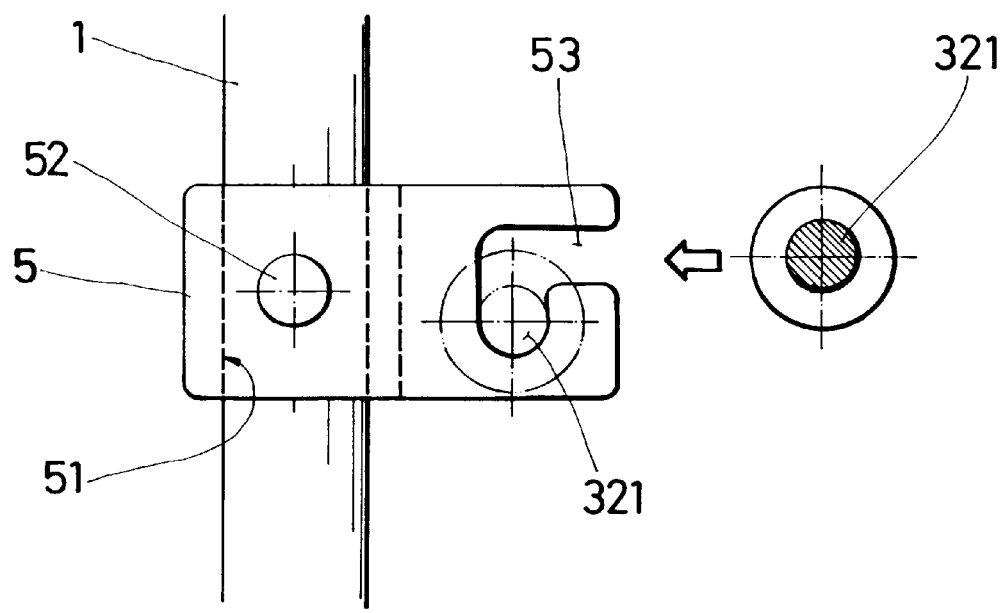
FIG. 5 is a top view illustrating engagement of a front wheel axle of a baby carrier to the wheel seat in FIG. 4.

The wheel seat 5 includes a tubular section 51 so as to be securely mounted around the mediate portion of the rod 1 by a rivet 52 or the like. The wheel seat 5 includes a substantially L-shape retaining slot 53 into which an axle 321 of a front wheel 32 of the baby carrier 3 is inserted. FIG. 5 illustrates insertion of the axle 321 of the front wheel 32, which is self-explanatory.

Figure 6:
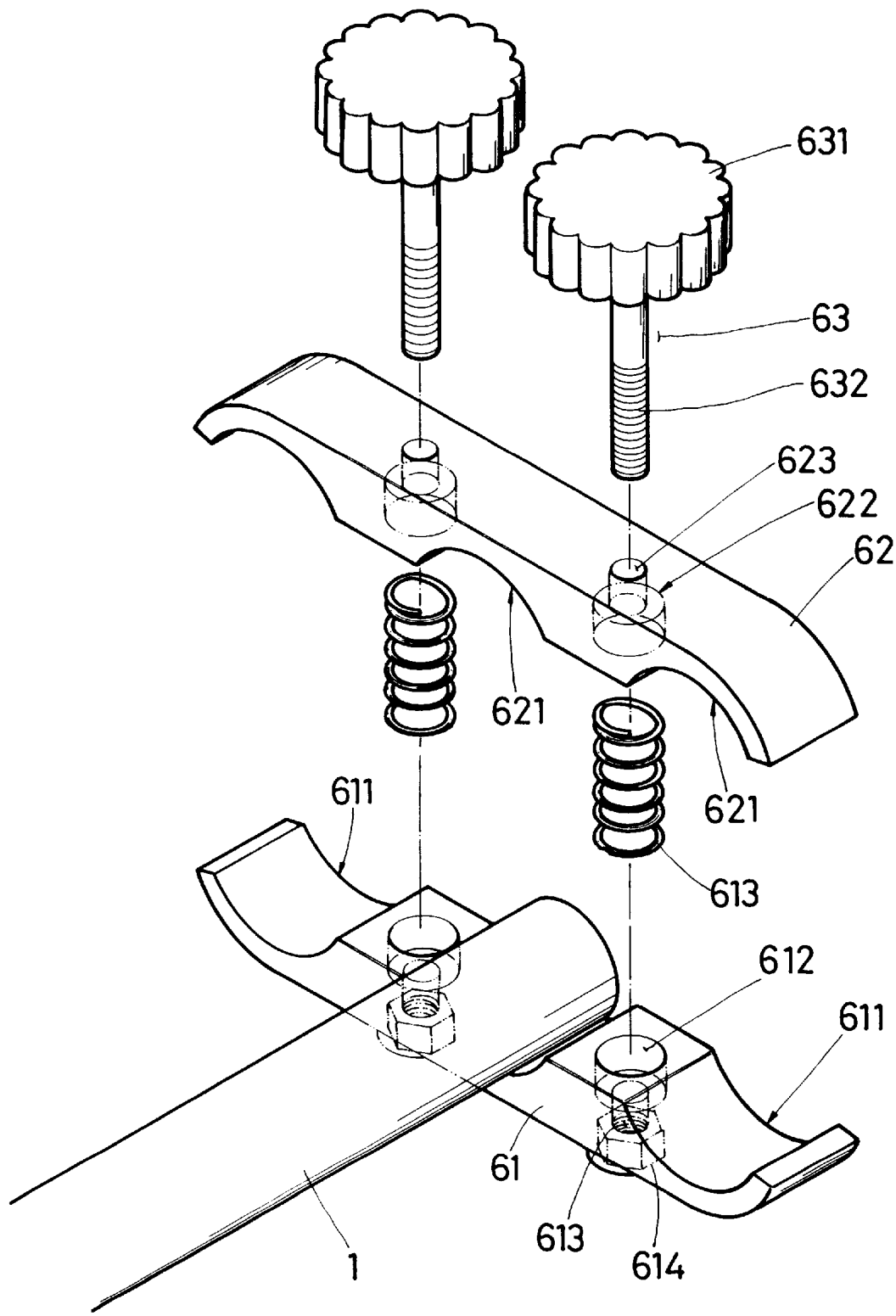
FIG. 6 is an exploded perspective view of a rear coupler of the trailing rod assembly in accordance with the present invention.
Figure 7:
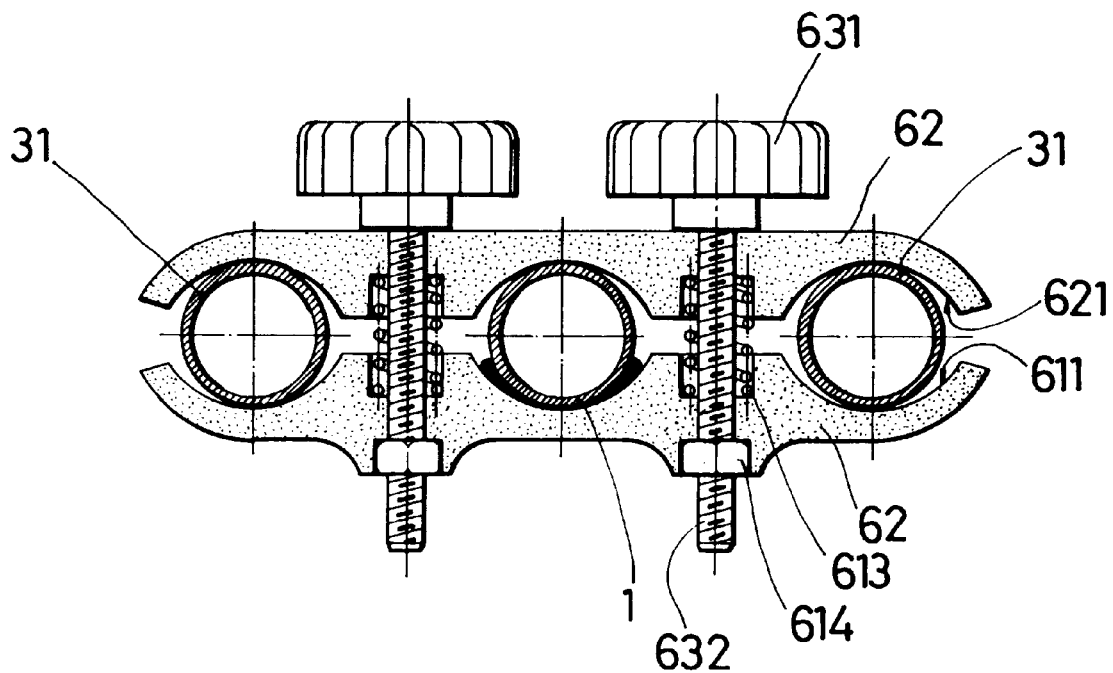
FIG. 7 is a sectional view of the rear coupler.

Referring to FIGS. 1, 5, and 6, the rear coupler 6 includes a lower plate 61, an upper plate 62, and two fixing knobs 63. The lower plate 61 includes three spaced arcuate grooves 611 in an upper side thereof, each two adjacent arcuate grooves 611 being spaced by an intermediate portion (not labeled). A receptacle 612 is defined in each intermediate portion and has a nut 614 embedded in an end thereof. The nut 614 has a screw hole 613. The upper plate 62 includes three spaced arcuate grooves 621 in an underside thereof, each two adjacent arcuate grooves 621 being spaced by an intermediate portion (not labeled). A receptacle 622 is defined in each intermediate portion. A through-hole 623 is defined in each intermediate portion of the upper plate 62 and aligned with a receptacle 622. Each fixing knob 63 includes a main body 631 and a screw 632 extended from the main body 631. Two further elastic members 414 are provided and each includes an upper end received in the receptacle 622 of the upper plate 62 and a lower end received in the receptacle 612 of the lower plate 61. The screw 632 of each fixing knob 63 is extended through the associated through-hole 623 of the upper plate 62 and engaged in the screw hole 613 of the nut 614 embedded in the associated receptacle 612 of the lower plate 61. As shown in FIGS. 6 and 7, a rear end of the rod 1 is held between the mediate grooves 621 and 611 of the upper and lower plates 62 and 61 and is securely retained in place when the fixing knobs 63 are rotated and thus tightened. As illustrated in FIG. 7, the rear end of the rod 1 is soldered to a surface of the mediate groove 611 of the lower plate 61.

Referring to FIG. 1, the beam-fixing seat 7 is provided to receive front ends of the lower beams 31 of the baby carrier 3 and has a pin 71 extended therethrough, thereby reliably fixing the front ends of the lower beams 31 of the baby carrier in place.

In assembly, referring to FIGS. 1, 6, and 7, the front ends of the lower beams 31 of the baby carrier 3 are extended through two outer arcuate grooves 611 of the lower plate 61 of the rear coupler. Lower ends of the elastic members 613 are mounted into the receptacles 612 of the lower plate 61. The upper plate 62 is assembled to the lower plate 61 with upper ends of the elastic members 613 received in the receptacles 622 of the upper plate 62 and with the arcuate grooves 621 accommodating the rear end of the rod 1 and the front ends of the lower beams 31, respectively. The fixing knobs 63 are mounted to securely connect the upper and lower plates 62 and 61 together and to securely hold the rear end of the rod 1 and the front ends of the lower beams 31 of the baby carrier 3, as mentioned above.

Front ends of the lower beams 31 of the baby carrier are respectively mounted to two sides of the beam-fixing seat 7 and the pin 71 is extended through the front ends of the lower beams 31 and the beam-fixing seat 7. Thus, the front ends of the lower beams 31 are reliably positioned by the pin 71 and by the upper and lower plates 62 and 61. Next, the axle 321 of the front wheel 32 of the baby carrier 3 is inserted into the L-shape slot 53 of the wheel seat 5 (FIG. 5) and thus retained in place. Thus, the front wheel 32 can be carried along with the baby carrier 3.

Thereafter, the arcuate groove 411 of the main plate 41 of the front coupler 4 is attached to a side of the chain stay 2 and the movable plate 42 is engaged to the other side of the chain stay 2. The front end of the rod 1 is retained in the hollow cylinder 412 and positioned by pin 442. The fixing knob 43 is extended through the through-hole 425 of the movable plate 42 and the screw 432 of the fixing knob 43 is threadedly engaged with the nut 416. Upon manually tightening the fixing knob 43, the chain stay 2 is reliably held in place. Thus, reliable coupling between the chain stay 2 and the front end of the rod 1 is provided by the front coupler 4.

Although the invention has been explained in relation to its preferred embodiment, it is to be understood that many other possible modifications and variations can be made without departing from the spirit and scope of the invention as hereinafter claimed.

What is claimed is:

1. A trailing rod assembly for coupling a baby carrier with two lower beams to a chain stay of a bicycle, the trailing rod assembly comprising:

a substantially S-shape rod having a front end, a rear end, and a mediate portion, a front coupler mounted to the front end of the rod, the front coupler including a main plate, a movable plate, a first fixing knob, and a flexible tube, the main plate including a first arcuate groove defined in a first end thereof and a hollow cylinder formed on a second end thereof, the main plate further including a first receptacle defined in a mediate portion thereof, the first receptacle having a first nut embedded in an end thereof, two spaced first lugs being formed on the first end of the main plate and including aligned holes, a transverse pinhole being defined in the hollow cylinder, the movable plate including a first end with a second lug that is received between the spaced first lugs, the second lug having a hole aligned with the aligned holes of the first lugs, a pivotal pin being extended through the first lugs and the second lug, thereby pivotally connecting the first end of the main plate with the first end of the movable plate, the movable plate further including a second end with a second receptacle defined therein, a first through-hole being defined in the second end of the movable plate and aligned with the second receptacle, the movable plate having a second arcuate groove defined in a mediate portion thereof, the first arcuate groove and the second arcuate groove together defining a space for securely holding the chain stay, an elastic member including a first end received in the first receptacle of the main plate and a second end received in the second receptacle of the movable plate, the first fixing knob including a main body and a screw projected from the main body, the screw of the first fixing knob being extended through the first through-hole of the movable plate and engaged in the first nut embedded in the first receptacle of the main plate, the flexible tube including a first end with a sleeve mounted thereon and a second end, the first end of the flexible tube being securely mounted in the hollow cylinder by a first pin extended through the transverse through-hole of the hollow cylinder and the sleeve, the second end of the flexible tube being secured to the front end of the rod by a second pin, a wheel seat mounted to the mediate portion of the rod, the wheel seat including a tubular section so as to be securely mounted around the mediate portion of the rod by a rivet, the wheel seat including a substantially L-shape retaining slot adapted to retain an axle of a front wheel of the baby carrier, a rear coupler mounted to the rear end of the rod, the rear coupler including a lower plate, an upper plate, and two second fixing knobs, the lower plate including an upper side with three spaced third arcuate grooves, each two adjacent said third arcuate grooves being spaced by a first intermediate portion, a third receptacle being defined in each said first intermediate portion and having a second nut embedded in an end thereof, the upper plate including three spaced fourth arcuate grooves in an underside thereof, each two adjacent said fourth arcuate grooves being spaced by a second intermediate portion, a fourth receptacle being defined in each said second intermediate portion, a second through-hole being defined in each said second intermediate portion of the upper plate and aligned with an associated said fourth receptacle, each said second fixing knob including a main body and a screw extended from the main body, two second elastic members being provided and each including an upper end received in the associated fourth receptacle of the upper plate and a lower end received in an associated said third receptacle of the lower plate, the screw of each said second fixing knob being extended through an associated said second through-hole of the upper plate and engaged in said second nut embedded in the associated third receptacle of the lower plate, the rear end of the rod being held between a middle one of the third arcuate grooves of the lower plate and a middle one of the fourth arcuate grooves of the upper plate and being securely retained in place when the second fixing knobs are rotated and thus tightened, the rear end of the rod being soldered to a surface of the middle one of the third arcuate grooves of the lower plate, each of outer ones of the third arcuate grooves of the lower plate and an associated said fourth arcuate groove of the upper plate together define a space through which an associated said lower beam of the baby carrier adapted to extend, and a beam-fixing seat mounted between the wheel seat and the rear coupler, the beam-fixing seat receiving the front ends of the lower beams of the baby carrier and having a third pin extended therethrough, thereby reliably fixing the front ends of the lower beams of the baby carrier in place.

* * * * *